Figure 1:
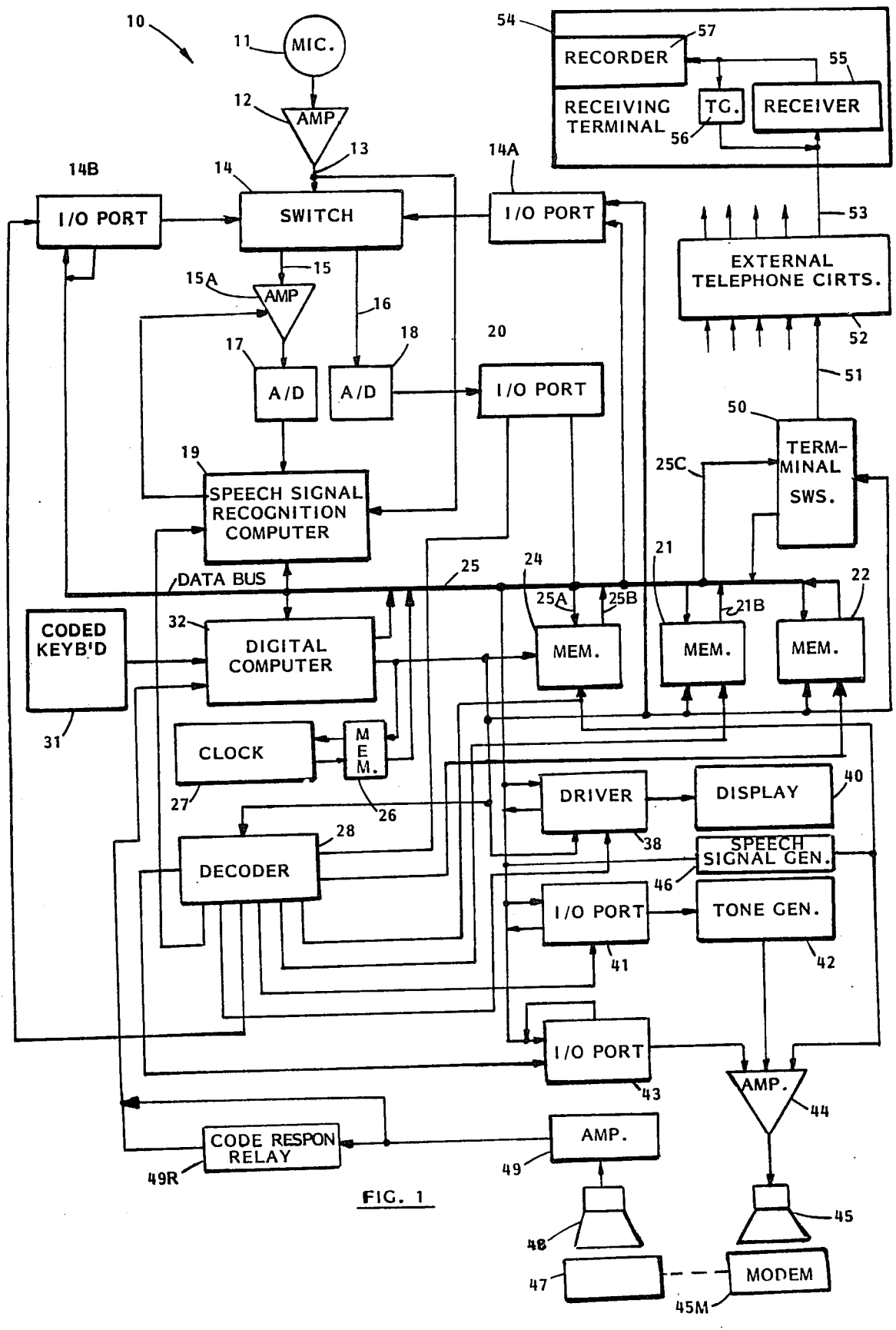

United States Patent [19]

Lemelson

[11] Patent Number: 4,856,066
[45] Date of Patent: Aug. 8, 1989

[54] SPEECH COMMUNICATION SYSTEM AND METHOD

[76] Inventor: Jerome H. Lemelson, 48 Parkside Dr., Princeton, N.J. 08540

[21] Appl. No.: 927,380

[22] Filed: Nov. 6, 1986

[51] Int. Cl.$^4$ .................. H04M 3/38; H04M 3/50; G10L 5/00

[52] U.S. Cl. .................. 381/36; 364/513.5; 379/89; 379/197; 379/198

[58] Field of Search .......... 381/36, 45; 379/100, 379/109, 89, 197, 198; 364/513.5; 358/256, 257, 903

[56] References Cited

U.S. PATENT DOCUMENTS

| | | | |
|---|---|---|---|
| 3,869,576 | 3/1975 | Griggs | 381/44 |
| 4,757,525 | 7/1988 | Matthews et al. | 379/89 |

FOREIGN PATENT DOCUMENTS 3518337  12/1986  Fed. Rep. of Germany ........ 381/44

*Primary Examiner*—Patrick R. Salce
*Assistant Examiner*—Emanuel Todd Voeltz

[57] ABSTRACT

An electronic system and method for communicating and composing messages by means of speech spoken into a microphone. Speech signals output by a microphone when select words of speech are spoken therein, are computer processed and analyzed to generate select code signals. The body of a message is formed either of such code signals generated when select speech is spoken and computer analyzed or when the results of such analysis, select code signals, are employed to query a memory in which a plurality of messages are stored, to selectively reproduce a message or messages therefrom to comprise the information or message desired to be transmitted. The identity of the sender or message composer and one or more recipients of the message or messages so formed, are functions also effected by the computer analysis of speech signals generated when select words of speech are spoken into the microphone. Routing instructions or switching codes for the message are also generated as a result of speaking select speech into the microphone, either by computer analysis of each word or group of words spoken to generate codes defining the switching codes or by employing codes so generated to query a memory to generate the switching signals and incorporate same in a series of code signals defining the message to be transmitted, the identity of the sender and recipient(s) and such switching code signals.

23 Claims, 2 Drawing Sheets

SPEECH COMMUNICATION SYSTEM AND METHOD

BACKGROUND OF THE INVENTION

This invention is in the field of message composing and transmission, particularly under the control of one or more electronic computers in a manner to simplify communication between individuals, such as executives of corporations, although it is not limited to such personnel. In its ultimate form, not only are messages composed solely by speaking select speech into a microphone, but additional information relating to the identity of the sender or person composing the message or messages and routing or switching instructions are similarly generated. A speech recognition computer is employed which recognizes speech signals generated on the output of a microphone and generates coded electrical signals which are applied to compose and/or record the message and define or compose additional messages or portions of the signals which define the message, to identify the sender or sending station, the recipient or recipients and their locations as well as switching signals which are employed to automatically route or transmit the message over a switching network to the one or more intended recipients thereof, thus eliminating the need to send and receive printed matter or to operate a manual device, such as a keyboard or typewriter. Auxilliary communication functions, such as immediate indication that the message has been transmitted and received in its entirety, the activation of a warning device, display or verbal means for indicating that the message is recorded at the receiving end and awaiting reply, an indication as to its importance or priority, time of message transmission and receipt, etc. are also effected by means of select speech and computerized speech signal processing and analysis.

DESCRIPTION OF THE PRIOR ART

The prior art consists of facsimile systems requiring typewritten or hand written message composition to generate the hard copy to be used in message transmission, keyboard generated and transmitted messages and personal telephone transmitted spoken messages which are magnetically recorded by a telephone answering machine. All of such prior art systems require substantial physical effort on the part of the persons composing the message to operate the keys of a keyboard and/or dial a telephone number.

SUMMARY OF THE INVENTION

This invention relates to a system and method for communicating, particularly between individuals or individuals and groups, wherein human physical effort is reduced or minimized. In particular, the invention is directed to electronic means for recognizing when select words of speech are spoken into a microphone and generating either or both message defining signals and message transmission control signals as a result of such electronic or computer analysis. In addition to reducing human effort in effecting message composition and transmission, the system and method provides means for substantially reducing the time it takes to compose and transmit messages and to determine if the messages are properly received and recorded.

Accordingly it is a primary object of this invention to provide a system and method for automatically composing messages in accordance with select speech spoken into a microphone by a person seeking to compose one or more messages.

Another object is to provide a system and method for effecting both the composition and automatic transmission of messages, utilizing select speech to both compose and control the transmission of messages.

Another object is to provide a system and method for communicating between individuals or an individual and a group wherein the recipient or recipients of a message or messages are not immediately available to receive and read or listen thereto, and wherein both message composition and transmission and controlled by means of select verbal speech.

Another object is to provide a system and method for composing messages and effecting the automatic transmission of messages by speaking select speech into a microphone and computer processing and analyzing the speech signals output by such microphone, wherein instructions relating to both the composition and transmission of messages may also be automatically derived by speaking select speech into the same microphone.

Another object is to provide a system and method for composing messages formed of digitized speech signals recorded in a memory for automatic transmission, wherein such automatic transmission is effected and controlled by signals generated when select words of speech are spoken into a microphone.

Another object is to provide a system and method for composing messages formed of digitized speech spoken into a microphone and coded electrical signals reproduced from a memory in response to speaking select words of speech other than that defining the digitized speech into such microphone.

Another object is to provide a system and method for communicating by composing and transmitting messages on an automatic communication network, such as an automatic telephone switching system wherein speech alone is employed to both compose and effect the automatic transmission of messages, thereby eliminating the need to operate a keyboard.

Another object is to provide a system and method for composing and automatically transmitting messages with minimum human effort and minimum delay ordinarily experienced when messages are composed and transmitted by keyboard operation.

Another object is to provide a system and method for composing messages and effecting their automatic transmission to select individuals or locations in an automatic switching network wherein auxilliary functions relating to message transmission and receipt are controlled by speaking select speech into a microphone.

Another object is to provide a system and method for automatically composing and transmitting messages from a central message forming station which is accessible by users of the system to both compose and transmit messages and receive messages.

Another object is to provide a message composing system and method employing both manually operated switch means and automatic speech recognition computing means to effect correct message composition.

Another object is to provide a message composing system and method in which data generated and recorded may be easily monitored in response to select speech commands.

Another object is to provide a message composing system and method in which composed message data is automatically displayed as it is generated.

Another object is to provide a message composing system and method in which message data may be selectively erased, corrected or changed in a rapid manner in response to select speech commands spoken by the person composing the message.

Another object is to provide a message composing system and method in which pictorial data may be incorporated into a message or provided therewith to be transmitted to a select recipient.

Another object is to provide a message composing system and method in which select message data is available for local monitoring and monitoring from a remote location in response to the generation of select control signals.

Another object is to provide an automatic information generating and transmission system which may be operated by speech commands to generate and automatically transmit select information derived from a memory on a communication network.

With the above and such other objects in view as may hereafter more fully appear, the invention consists of the novel circuitry and arrangements of components, and methods, as will be more fully described and illustrated in the accompanying drawings but it is to be understood that changes and modifications may be resorted to which fall within the scope of the invention as claimed without departing from the nature and spirit of the invention.

Figure 2:
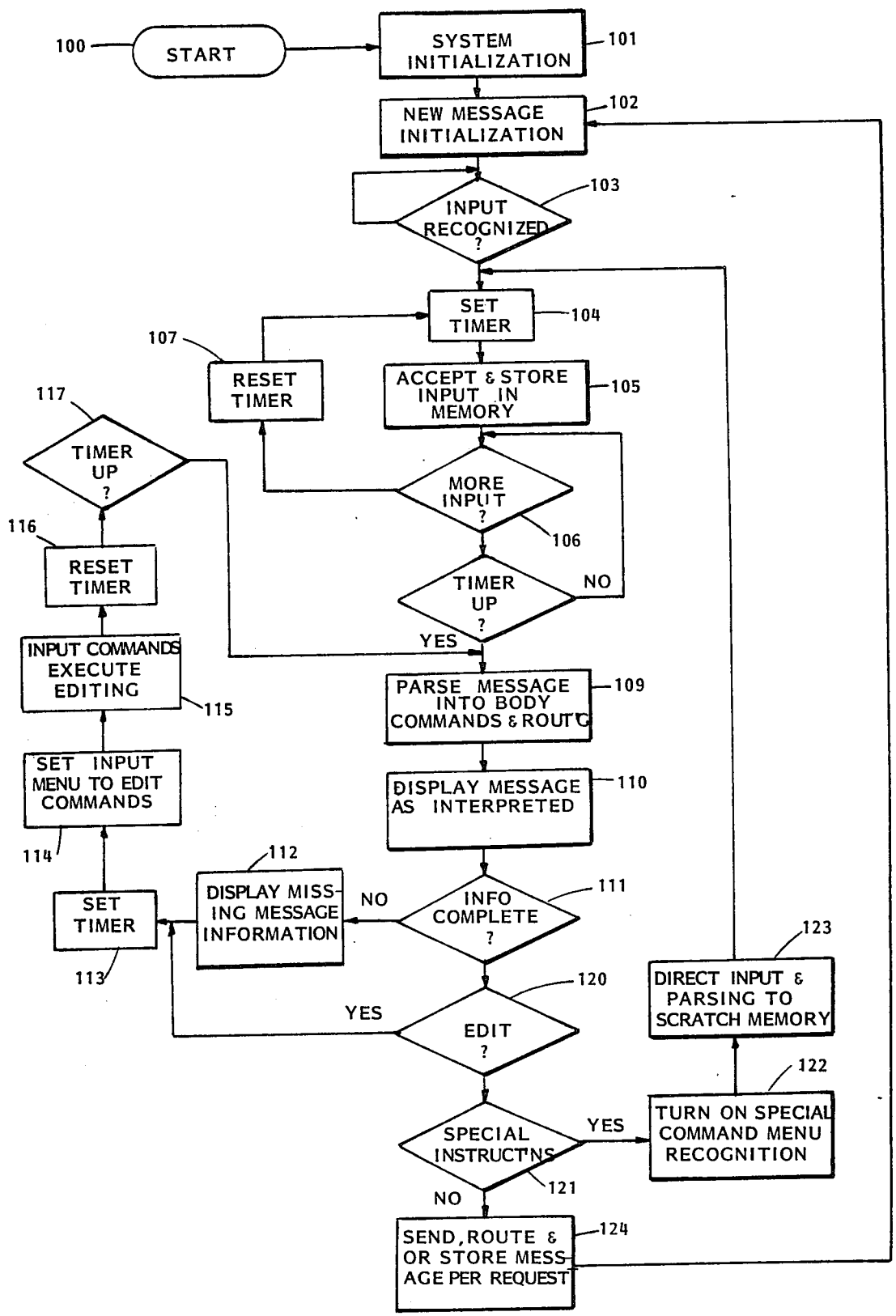

FIG. 1 is a schematic diagram of an automatic message composing and transmission system, and FIG. 2 is a flow diagram illustrating the operation of the message composing and transmission system of FIG. 1.

In FIG. 1 is shown an electronic system 10 for generating and transmitting data in the form of messages, which are composed when a person speaks select words of speech into a microphone 11, wherein such select speech and the resulting speech signals output by the microphone are computer processed and analyzed to provide such communication variables as the body of a message or a portion or portions thereof, codes defining identification of the message, a code or codes defining the person originating or generating the message, the recipient or destination of the message, the routing or path of communication for the message, the time and date the message was originated and/or transmitted, the location of the sending station for the message, message priority and/or classification, the required reply or feedback information relating to the receipt of the message as well as code signals which are operable to compose or assemble the entire message, etc.

The output of microphone 11 is amplified by an amplifier 12, the output 13 of which is passed through a switch 14 to a selected of a plurality of circuits which are employed in composing information or messages, in temporarily storing message components and in effecting the electrical or light wave transmission of messages on a switching network to one or more selected terminal circuits or receivers thereof.

Switch 14 may comprise a manually operable, sound speech activated switch with more than two outputs, which is operated either by hand and/or signals generated by a speech recognition computer 19 which recognizes select speech signals generated on the output of a transducer or microphone 11 when a person, about to compose a message, speaks a select word or words. The speech analyzing computer 19, which may comprise speech signal recognition electronic circuitry associated with a microelectronic computer chip, such as the General Instruments Corp. SP-1000, decodes and analyzes speech signals output by the microphone 11 and passes the resulting recognition code signals to a digital computer 32 having and input-ouput port 14A, an output of which is applied to control the operation of switch 14 in the mode of operations illustrated in FIG. 1. One output 15 of switch 14 passes the analog speech signals to an automatic gain controlled amplifier 15A, the output of which is connected to an analog-to-digital converter 17 having an output connected to the input of speech analyzing computer 19, which analyzes the digitized speech signals received for automatic recognition purposes.

A second output 16 of switch 14 is connected to a second analog-to-digital converter 18, which digitizes the received speech signals defining the body of a message and passes same through an input-output port 20 for a memory 24, such as a solid state random access memory or RAM, in which the body or one or more select portions of the message are temporarily stored until the entire messages including control codes signals therefore such as switching signals for use in routing the message to one or more receivers or recipient terminals, have been generated in sequence and stored in such memory.

Recognition control signals generated by the computer 19 when it automatically recognizes digitized speech signals generated when select speech is spoken into the microphone 11, are passed therefrom to address two memories 21 and 22 to cause them to generate information defining code signals in sequence which are passed to memory 24. Memory 21 is addressed to generate select messages or parts of messages, such as words, phrases or sentences in accordance with the addressing code generated on the output of computer 19, and such information is passed on output 218 to memory 24 through a data bus 25 and recording input 25A as a pulse train or trains. A multitude of messages of any length may be recorded in memory 21 which may comprise an electrically or otherwise erasable memory such as an EEPROM, which is programmable by selectively operating a keyboard or other means to simplify the generation of messages or message components. For example, one or two select words of speech, such as a number or plurality of numbers spoken in a given sequence into the microphone 11, may be employed to generate code signals defining the body or portions of a message defining select words phrases and sentences and/or to effect reproduction of same from memory 21.

Memory 22 contains a plurality of auxiliary codes defining one or more variables as described, such as routing or switching signals, message recipient identification signals, etc., which are selectively reproduced therefrom and are recorded in the RAM 24 in sequence with the other signals generated. A fourth memory or computer 26, which is connected to be selectively activated by signals output by computer 19, retrieves codes defining such variables as time and date, etc. from a calendar/clock signal generator 27, which codes are transmitted to and recorded in RAM 24. Upon receipt of speech signals generated when an end-of-message word, such as the word "stop" or a combination of words which are not normally spoken, are spoken into the microphone, speech analyzing computer 19 generates a control signal on an output 25B, which control signal is sensed by computer 32 and is utilized to generate sequential addressing signals for addressing the memory 24 so as to clock out the message recorded therein on an output 25B which is connected through a data bus 25 to a communication network 50, such as an automatic telephone switching system.

To permit the person composing messages to monitor the information generated when select speech is spoken into the microphone 11 and the speech signals output thereby are electronically recognized, such as the information defining the body of the message and the auxiliary information which includes routing and destination codes, a display 40, such as a character writing cathode ray tube or solid state LCD display, is provided, which is controlled to display one or more lines of characters defining the information which is stored in memory 24. Display 40 is controlled by a display driver 38 which receives signals output by the speech recognition computer 19 and/or the memory 24 as the latter is automatically queried by signals generated by computer 32. If an error is visually discerned, the operator may effect complete erasure of the memory 24 or the select erasure of select codes or portions of messages recorded in such memory, by manual means, such as by selectively operating the keys of an encoded keyboard 31 and/or by speaking select words of speech into the microphone. In the latter means for correcting errors, coded signals output by the speech analyzing computer 19 are employed to effect such function.

Speech recognition by means of the electronic speech signal recognition computer 19 and auxiliary control means, may also be employed to change the auxiliary codes as well as the data or message signals by effecting erasure of all or selected portions of the signals which are stored in memory 24 in accordance with erasure control signals generated when select words of speech are spoken into the microphone 11 and are electronically recognized. Speech recognition computer 19 contains circuitry, or is connected to suitable external logic switching circuits, which may be defined by or provided in the computer 32 which is operable to generate code signals for controlling such functions as (a) the detection of select portions of messages or message codes which are recorded in memory 24, (b) control message erasure or portions thereof such as recordings of select words, phrases, sentences and paragraphs or other data defining portions of the message; (b) rearranging select portions of the message or message elements; (c) adding new codes to selected locations of the message or messages, etc.

System 10 may also be supported in a portable housing, wherein the output 25B of memory 24 is connected to activate a speaker or tone generator 45 which may be acoustically coupled to a telephone handset or a microphone of a modem 45M. Thus the system may be made portable to permit the user to generate and prepare messages while away from his office or place of work and to transmit same via telephone to any telephone terminal in an automatic telephone switching system by manually dialing the desired number or by using the switching codes generated by speaking select speech into the microphone 11 to effect such automatic phone line connection. The system 10 may thus be used to effect automatic telephone line connections between two telephone terminal circuits by speaking one or more select words into the microphone 11, electronically recognizing the speech signals generated to automatically query the memory 21, causing a select telephone switching code to be generated on the output of such memory and converting such code to a tone code in a tone code generator 42 which is connected to an output or outputs of memory 21. By acoustically coupling the output of such tone generator to a telephone microphone or handset, the tone signals generated may be applied to the telephone line and switching system for effecting the automatic connection of the memory terminal or junction, with another terminal or junction in the switching network.

While the digital computer 32 may contain electronic circuits for generating digital synthetic speech signals of select words of speech defining all or one or more portions of the body of a message when select speech is spoken into the microphone 11 and recognized by the speech signal recognition computer 19 which applies select coded control signals to generate such select synthetic speech signals, an auxilliary synthetic speech generating computer and memory 46 are shown connected to data bus 25 for receiving input control signals generated on the outout of the computer 32 for generating select speech signals on an output thereof. Such synthetic speech signals may be applied to effect one or more of several functions, one of which is to generate sounds of select words of speech on the output of the speaker 45 to permit the person operating system 12 to receive select instructions from the computer 32 relating to message generation, transmission and receipt. A second function is to provide select synthetic speech signals defining all or one or more portions of a message on the input to the message composing memory, RAM 24 in accordance with the commands or speech spoken into the microphone 11. A thrid function of the speech signal generator 46 is to provide speech signals on the input to the modem 45M to which the speaker 45 is coupled, which latter signals do not form part of the composed message but provide auxilliary data or instructions to the recipient of the message, such as a verbal indication of its availability or importance.

Also provided in the system 10 is a receiver 47, which may be part of the modem 45 or the speaker of a telephone handset, which is coupled to a microphone 48 for receiving and transmitting one or more coded electrical signals or tones from the terminal circuit to which the output of system 10 is connected, to the computer 32 for effecting feedback control, such as the generating of signals defining the message or body of the message and end-of-message signals after the connection has been established. The output of microphone 48 is connected to an amplifier and transmitter 49 which is shown connected directly to the digital computer 32 and/or to an intermediate code responsive circuit or relay 49R which responds to feedback code signals received by the receiver 47 and generates a code signal which is applied to an input to the computer 32.

Although not shown, an address circuit or device may be disposed between the output of digital computer 32 and the message composing and storage memory 24 to permit address signals generated by such computer when select keys of the keyboard 31 are activated and/or generated as select codes on the output of the speech recognition computer 19, to be applied to effect the reproduction of all or select portions of the message signals recorded in memory 24 and their application to display driver 38 for display such selectively reproduced data for selective monitoring by the operator of the system, such as the person composing the message or another person seeking to monitor the message or portion thereof recorded.

Select keys of keyboard 31 may be activated to effect message editing, correction and erasure as well as the generating of select portions of the body of the message with keyboard generated code signals and/or signals derived from one or more of the auxilliary memories, such as memories 21 and 22 or one or more additional memories (not shown) which may comprise one or more RAM memories or recorders containing selectively reproducible words, phrases, sentences, paragraphs or pages of message information which are so selectively accessible and operable to apply the selectively reproduced signals to the message composing memory 24. Coded control signals output by speech signal recognition computer 19 when select speech is spoken into microphone 11 and recognized thereby may also be employed to address such memory or memories to reproduce select message information therefrom and apply same to be recorded in memory 24 as described in the composition of messages.

While a decoder 28 is shown connecting the output of computer 32 to various components and subsystems of the system 10, it may be replaced by a junction if decoding means is provided with each port controller and the display driver 38.

Also shown in FIG. 1 is a connection between the data bus 25 and an output of the terminal circuit of system 10 to the terminal network switches 50 of an automatic switching system 52 such as an automatic telephone switching and connection system. Notation 53 refers to a connection established between the automatic switching system 52 and a select remote terminal circuit 54 thereof, such as the telephone terminal circuit of the recipient of the message composed by the operator of system 10. A receiver 55 receives the first part of the composed message which includes a query code which is applied to a code responsive tone or code generator 56 which transmits a tone or code on the connected circuit back to the sending station which is transmitted on the data bus 25 to the computer 32 which controls memory 24 to reproduce the remaining portion of the message including the body of the message after the initial portion or portions thereof have effected the switching functions necessary to effect the connection to the one or more receiving stations. A memory or recorder 57 at the receiving station 54 records the body of the message and any auxilliary message signals, such as a flag signal or signals employed to activate a display or warning device that the message has been received and recorded.

It is also noted that, while microphone 11 may comprise a conventional microphone connected to a computer terminal which includes computers 19 and 32 as well as the other circuit elements and subsystems illustrated in FIG. 1 or modifications thereto as described, such microphone may also comprise, or be supplemented with, the microphone or mouthpiece of a conventional telephone. If a suitable modem is employed to which such telephone microphone and its speaker is coupled, then speech signals generated by a person speaking into the microphone or mouthpiece, of any remote telephone which is connected to such modem by dialing or other means may be employed, as described, to provide coded control signals when select speech signals are recognized by computer 19 for controlling computer 32 to effect select message composition and transmission to any other select terminal or recipient in the system as well as the select reproduction of the message or messages in the memory 24 generated by the same or another person at the location of system 10 or at any other remote location which is similarly connected to the terminal containing system 10 when message generating and transmission signals are so generated when select speech signals are received thereby.

In the flow diagram illustrated in FIG. 2, flow control of the electronic message composing and forwarding system 10 starts at step 100 when the operator of the system either speaks a select word or words of speech into the microphone or manually closes the start switch. System variable and processor start-up is accomplished at step 101. Operational flow proceeds to step 102 where new variables associated with the message to be composed, such as the time or length of the message, location of a message in memory, priority or importance of the message, time and date of composition of the message, deadline or time in which a response or reply is required, programming of a speech signal generating computer or loading of its memory with signals relating to a speech look-up table, etc. Control thereafter passes from step 102 to 103 at which latter step monitoring is automatically effected of the code and control signal generating subsystems such as the speech recognition computer, the keyboard, if utilized, to detect their outputs, whereupon a timer is set and control passes to step 105 where code or speech signals defining the body of a message, command and routing codes are digitized and entered in memory to compose the entire message. The inputs to such memory are constantly monitored at step 106 which, if detected, results in resetting the time at step 107. If so reset, logic flow resumes at step 105 whenever an input activity is sensed. If no input activity is sensed at step 106, control, passes to step 108 where the count of the timer is checked to detect if it has run out. If the timer has not completed its cycle, control returns to step 106 where the outputs of the speech recognition computer and the keyboard are sensed. Whenever output and input activity are not sensed during a complete timed cycle, flow passes to step 109 at which the input message is parsed into segments defining routing, message composition, identification of sender and message recipient, etc. Such parsing may be accomplished by the computer when it detects key words or by means of special syntatical structures particular codes forming select parts of the message selectively reproduced from the memory. Control next passes from step 109 to 110 where the selectively generated message is displayed or is generated as audible speech from speech signals generated on the output of a synthetic speech signal generator as described. Thereafter flow continues at step 111, at which step the input message component signals are automatically scanned to determine if the message and its associated control and switching signals have been completely generated and recorded in memory. At step 111 missing information may be either automatically inserted into the composed message from reproductions of signals previously generated as described and recorded in memory or when the person composing the message personally reenters the missing data by speaking select words into the microphone, operating the keyboard or other means for generating the missing components or components of the message. For example, the destination or name of the person to which the message is to be sent may be spoken into the microphone to generate a respective code defining same and the speech recognition computer may operate thereafter to recognize the resulting speech signals and to generate and insert the necessary signals, such as the switching signals necessary to regenerate the destination or switching code signals to define the telephone terminal circuit of the recipient, the address of the recipient or other routing signals, if such were not specifically generated and included in the message signals scanned. If an error or omission is detected at step 111, control passes to step 112 where data indicating the error condition is displayed and/or generated as synthetic speech. Thereafter control passes to step 113 at which a timer is set, whereafter control passes to step 114 at which command signals are generated by keyboard operation or by speaking select speech into the microphone to effect editing by means of an electronic editing subsystem.

Control next passes from step 114 to step 115 at which editing commands are entered and executed, After the entry of each editing command, the timer is reset at step 116 and operation returns to the activation of the editing subsystem at step 115. If step 117 is reached and the timer has not run out, system flow proceeds to step 109 and proceeds through step 111 as described.

If no errors or omissions are detected during step 111, control passes to step 120 wherein the person operating the system is prompted to speak select speech into the microphone for generating a command or commands which are operable to effect any desired changes in the body of the message, and/or any other portion or portions of the message such as the portions thereof defining the destination or destinations, person or persons to whom the message is to be sent and the routing or switching signals necessary to properly transmit the message through the switching network or automatic telephone switching system. If such editing is requested by the user or sender, as the result of monitoring the information displayed, control again proceeds to step 113 and continues as described to permit the error or errors or omissions to be corrected.

If the editing device or subsystem is not activated at step 120, control proceeds to step 121 where the operator is queried to provide additional instructions, such as an order to hold the message in memory for a specified time before transmitting it to one or more of a plurality of selected destinations or recipients, or to cancel all or a portion of the message, or to transmit a select portion or portions of the message to one or more select persons or terminals of the communication system. If additional instructions are requested, control proceeds from step 121 to step 122 at which select control words are recorded in the memory or dictionary for the speech recognition computer. Control then passes to step 123 where a select scratch area of the memory is activated for use in effecting subsequent automatic speech recognition functions, to define, for example, the integrity of the message just generated. Control may then resume at step 104 and continue as described.

If no special instructions were required at step 121 control passes to step 124 where the time the message is generated or entered is added as a code or code signals to the message and the message is either held in memory for a select time or immediately reproduced from temporary memory and transmitted to the automatic communication system. Control then returns to step 102 where the system is provided in a state of readiness to be operated for generating and recording a new message.

Modifications to the Composition and operation of the message composing and transmitting system described and illustrated in the drawings are noted as follows:

1. The body of a message composed and recorded in memory for transmission to one or more selected recipients or terminal circuits of the automatic communication network or automatic telephone switching system may be composed of (a) digital speech signals generated by digitizing the analog speech signals generated when speech defining the words of the message is spoken into the microphone; (b) digitized synthetic speech signals generated from a message composition memory containing a plurality of messages or portions of messages such as a selectively reproducible digital speech signals of words, phrases, sentences, paragraphs or pages of alpha-numeric characters defining words or other data which is selectively reproducible from such memory in response to address signals generated by the speech signal recognition computer when select speech is spoken into the memory and recognized thereby; (c) a combination of digitized analog speech signals generated when speech is spoken into the microphone as in (a) and digitized synthetic speech signals generated as in (b) recorded in the message recording memory as one or more groups or trains of such signals in the desired sequence to make up the entire memory.

2. Messages generated and transmitted to the automatic switching network as described may be routed to one or more intermediate locations in such network are temporarily stored thereat before being retransmitted from each to the next storage location or the destination terminal in a communication system where a plurality of messages may be simultaneously available in the network for transmission to the same terminal circuit or recipient. Such intermediate message storage at one or more locations may be operated to advantage to prevent interference between two or more messages generated and transmitted simultaneously to the network and to allow messages to be transmitted and received on a priority basis.

3. Messages generated and recorded in temporary memory at the message composition station, may be retained in such memory until requested by a recipient or a person authorized to receive same, whereupon when a request code signal is received from a requesting station which is connected to the sending station, the requested message is automatically reproduced from such memory and transmitted on the connected circuit through the switching network or a permanent communication link to the station requesting same. Such requests may be effected by means of request codes generated by an automatic controller or computer or by speaking select speech into a microphone at the requesting station or terminal and computer processing, analyzing and recognizing the resulting speech signals as described, which are transmitted either on the established circuit to the sending station or a circuit established by computer recognition of select speech signals generated by speaking select speech into a microphone at the requesting station.

4. The system illustrated in FIG. 1 may be modified to permit the generation and automatic transmission of select information other than speech or digital message signals of the types described. For example, an automatic video or picture signal generating means such as a facsimile generator or video camera scanning selected of a plurality of documents or other images, may be controlled in its operation to generate select analog and/or digital video signals on an output thereof extending to the data bus 25 in response to control signals generated on the outout of a speech recognition computer, such as 19, after a select communication link has been established with a select terminal circuit as described, which terminal circuit includes an automatic recorder for the facsimile or picture data transmitted thereto. The entire transmitting and recording operation may be effected under the control of the computer 32 which may also be operable to control speech message signal generation, recording and transmission as described.

What is claimed is:

1. An automatic electronic communication system comprising in combination:
    (a) a message composing and sending station including a first transducing means, such as a microphone, for transducing sounds of speech to electrical signals,
    (b) first electronic circuit means including electronic computing means for receiving, processing and analyzing signals output by said first transducing means in a manner to recognize signals generated when select words of speech are spoken into said microphone, said first circuit means being operable to generate control signals in accordance with the words spoken into said microphone,
    (c) second electronic circuit means connected to receive signals output by said first electronic circuit means for generating code signals which vary in accordance with the speech signals recognized by said first electronic circuit means,
    (d) third electronic circuit means including a memory connected to receive signals output by said second electronic circuit means and to record said signals therein,
    (e) control means for causing said memory to generate selected of the signals recorded therein on an output,
    (f) means controlled by a person speaking into said microphone for activating said control means upon completing a message to cause said memory to generate the complete message in the form of digital speech signals on said output,
    (g) electrically operable driving means connected to receive signals defining information generated by said second electronic circuit means,
    (h) intelligible indicating means connected to said driving means for intelligibly indicating information representative of the words of speech spoken into said microphone so as to permit a person composing messages to monitor the contents of messages generated by speaking into said microphone,
    (i) a communication network connected to the output of said memory for receiving signals reproduced from said memory,
    (j) a plurality of terminal circuits of said communication network, each containing a respective recording means for message signals received thereby,
    (k) switching means in said communication network,
    (l) code responsive means in said network connected to control the operation of said switching means,
    (m) said second electronic circuit means being operable, in response to the speaking of select words of speech spoken into said microphone, to generate code signals to which said control means for said switching means at said network is responsive to properly operate said switching means of said network and to cause messages transmitted to said network to be gated through said switching means to selected of said receiving circuits of said network.

2. A system in accordance with claim 1 including means for digitizing analog signals of select speech spoken into said microphone and recording the digital signals so generated directly in said memory in a selected order along with the code signals generated on the output of said second electronic circuit means.

3. A system in accordance with claim (1), said intelligible indicating means comprising an electronic display means and means controlled by the person speaking select speech into said microphone for causing said display means to display a select portion of the message recorded in said memory.

4. A system in accordance with claim 1 including digital-to-analog conversion means connected to the output of said memory, a speaker connected to receive analog signals generated by said digital-to-analog conversion means to generate sounds of speech and means controlled by the person speaking into said microphone for selectively reproducing message signals recorded in said memory and applying same to said digital-to-analog conversion means to permit such person to listen to a select portion of a message recorded in said memory.

5. A system in accordance with claim 1 including means at select terminal circuits of said communication network operable to receive messages transmitted on said communication network thereto for generating and transmitting feedback signals to the message sending station indicative that a connection has been established and means at said send station for receiving feedback signals generated on the connected circuits and indicating the establishment of the connection.

6. A system in accordance with claim 5 wherein said means indicating the establishment of a connection between the sending station and a select terminal circuit of said communication network includes means for querying said memory to cause it to generate and transmit the body of a message through said communication network to said selected terminal circuit.

7. A system in accordance with claim 1 including means at select terminal circuits of said communication network, which are operable to receive message transmitted thereto on said communication network, for generating and transmitting a feedback signal to the message sending station indicative that a complete message has been received thereby and means at said sending station for receiving said feedback signal and intelligibly indicating the complete receipt of the body of a message by said select terminal circuit and its recording thereat.

8. A system in accordance with claim 1 including a speaker at said message composing and sending station and means controlled by a person speaking select speech into said microphone at said sending station for selectively reproducing signals recorded in said memory and converting same to analog speech signals and applying said analog speech signals to said speaker to cause it to generate sounds of words of speech of the message signals recorded in said memory to allow said person to monitor the information recorded in said memory.

9. A system in accordance with claim 1 wherein said first electronic circuit means is operable to recognize select speech signals of speech spoken into said microphone which is indicative of the start of a message, the destination of a message, at least a portion of the body of a message and the end of a message and said second electronic circuit means is operable to generate code signals indicative of the start of a message, at least a portion of the body of a message, a number defining the destination of a message for use by said code responsive means of said communication network in establishing a select circuit connection with a select terminal circuit thereof and said sending station, and the end of a message.

10. A system in accordance with claim 9 including electronic circuit means for recording a plurality of code signals generated by said second electronic circuit means when respective select words of speech are spoken into said microphone and the speech signals output by said microphone are analyzed by said first electronic circuit means, which plurality of code signals are indicative of a plurality of terminal circuits of said communication network adapted to receive a single message, means for recording said plurality of code signals in the sequence in which they are generated in said memory, means for sequentially reproducing said plurality of code signals from said memory and applying same to said communication network to effect the establishment of a plurality of communication links to respective of said plurality of terminal circuits, and means for causing said memory to generate code signals defining the body of a message a plurality of times, each time after a communication link has been established between said sending station and a select terminal circuit and transmitting said body of message defining code signals on each of said communication links to respective of said terminal circuits when it is connected to said sending station.

11. A communication system comprising in combination with a communication network having a plurality of communication terminals, each containing means for generating and sending messages with at least certain of such terminals containing memory for receiving, recording and intelligibly indicating the contents of received messages, the improvement comprising:
(a) a microphone at a first of said terminals, into which microphone words of speech defining control and message information may be spoken to generate output control and speech signals,
(b) first electronic computing means connected to receive the signals output by said microphone, electronically process and analyze same,
(c) said first electronic computing means including:
first electrical circuit means for analyzing the signals output by said microphone when first selected speech indicative of the start of a message generating operation are spoken into said microphone and generating a first control signal,
second electronic circuit means for analyzing the signals output by said microphone when second selected speech is directed into said microphone which is indicative of a selected terminal of said system to which a message is desired to be transmitted and generating selected communication control signals,
third electronic circuit means for processing signals output by said microphone when selected speech is directed at said microphone which is indicative of the body of a message to be transmitted to said second terminal and generating digital signals defining said message,
fourth electrical circuit means for processing and analyzing signals output by said microphone when selected speech is spoken into said microphone defining the end of a message which is generated when selected speech defining a body of the message is spoken into said microphone,
(d) communication control computing means connected to receive communication control signals output by said second electronic circuit means and applying said control signals to effect a communication link between said first and second terminals of said communication network,
(e) means operable after a communication link has been established between said first and second terminals of said network for addressing said memory means of said first terminal and causing signals recorded therein to be reproduced therefrom and to be transmitted on said communication link from said first terminal to said second terminal and to be recorded at the recording means of said second terminal.

12. A communication system in accordance with claim 11 wherein said third electronic circuit means is operable to digitize the speech signals output by said microphone when said selected speech defining the body of a message is directed at said microphone.

13. A communication system in accordance with claim 11 wherein said third electrical circuit means includes a speech recognition computer for recognizing selected words of speech spoken into said microphone and generating coded electrical signals indicative of such selected words of speech and said second terminal contains synthetic speech signal generating means connected to the receiving means thereof and operable to generate selected synthetic speech signals in response to the code signals received from said first terminal and generated when the words of speech spoken into the microphone of said first terminal and defining the body of the message are analyzed and recognized by the speech recognition computer thereat.

14. A method of generating and communicating information comprising:
(a) speaking first select speech into a microphone located at a first communication terminal of a communication network and generating first speech signals on the output of said microphone,
(b) computer processing and analyzing said first speech signals and generating a first control signal,
(c) employing said first control signal to condition a first memory to record information output by said microphone,
(d) speaking second select speech into said microphone,
(e) computer processing and analyzing the signals output by said microphone when said second speech is spoken and generating communication control signals defined by the content of said selected second speech,
(f) recording said communication control signals,
(g) speaking third select speech defining a message to be communicated into said microphone,
(h) computer processing the signals output by said microphone when said third speech is spoken and generates digital speech signals,
(i) recording said digital speech signals in said memory,
(j) speaking fourth select speech into said microphone defining the end of the message to be communicated, (k) computer processing and analyzing the signals output by said microphone when said fourth select speech is spoken and generating an end-of-message indicating signal, (l) employing said end-of-message indicating signal to activate a communication computer, (m) operating said communication computer to cause it to effect the establishment of a communication link between said first communication terminal and a second communication terminal of said communication network, and when said communication link has been established, (n) thereafter reproducing said digital speech signals recorded in said memory and transmitting same on the communication link established by said communication computer to said second communication terminal, and (o) recording said digital speech signals received by said second terminal in a second memory thereat.

15. A method in accordance with claim 14 which includes also applying said first control signals to activate an intelligible indicating means to indicate to the person speaking into said microphone that said first control signal has been generated and said memory has been conditioned to record data thereafter.

16. A method in accordance with claim 14 which includes applying said communication control signals to activate an intelligible indicating means to indicate to the person speaking into said microphone that said communication control signals have been generated.

17. A method in accordance with claim 14 which includes applying said communication control signals to control an intelligible indicating means to indicate the identification of said second communication terminal defined by the communication control signals generated as the result of speaking said second select speech into said microphone.

18. A method in accordance with claim 14 which includes intelligibly indicating to the person speaking into said microphone the message defined by said digital speech signals to permit said person to determine that such message has been correctly composed.

19. A method in accordance with claim 18 which includes speaking selected further speech into said microphone and generating a correction control signal for selectively effecting erasure of said memory.

20. A method in accordance with claim 18 wherein said intelligible indication is effected by visually displaying characters and generating synthetic speech defining one or more select portions of the message composed by speaking select speech into said microphone.

21. A method in accordance with claim 14 which includes speaking select speech into said microphone for generating a plurality of communication control signals operable to effect, when selectively applied to said communication network, the establishment of a plurality of communication links between respective of a plurality of communication terminals of said network and said first communication terminal, and sequentially generating respective of said plurality of communication control signals on said communication network to establish respective links to each of said plurality of communication terminals, and after the establishment of each communication link, reproducing said digital speech signals from said memory and transmitting same on each communication link established between said first communication terminal and each of said plurality of communication terminals after it is operatively connected to said first communication terminal.

22. A method in accordance with claim 14 which includes speaking fifth select speech into said microphone defining a portion of a message to be communicated, computer processing and analyzing the speech signals output by said microphone when said fifth speech is spoken and generating address signals and applying said address signals to address a memory containing information recorded therein defining a number of portions of messages such as code signals of words, phrases, sentences and paragraphs so as to cause said memory to reproduce coded electrical signals of at least one message portion recorded therein, and applying said coded electrical signals reproduced from said memory in which said digital speech signals are recorded so as to effect the recording of messages therein composed of digital speech signals generated by speaking select message defining speech into said microphone and one or more words, phrases, sentences or paragraphs defined by signals reproduced from said latter memory.

23. A method of generating and communicating information comprising:
(a) speaking first select speech into a microphone and generating first speech signals on the output of said microphone,
(b) computer processing and analyzing said first speech signals and generating a first control signal,
(c) applying said first control signal to condition a memory to record information,
(d) speaking selected second speech into said microphone and generating second speech signals,
(e) processing said second speech signals and generating first destination defining control signals,
(f) recording said destination defining code signals in said memory,
(g) speaking third select speech into said microphone defining the body of a message to be transmitted and generating message speech signals on the output of said microphone,
(h) processing said message speech signals and generating digital message speech signals,
(i) recording said digital message signals in said memory,
(j) thereafter selectively reproducing said destination code signals from said memory and applying same to effect a control function including the establishment of a communication channel between said memory and a select terminal of a communication system,
(k) when such communication channel is established, reproducing said digital message signals from said memory and transmitting same on the established communication channel to said select terminal, and
(l) recording said digital message signals in a memory at the selected terminal of said communication system.

* * * * *